United States Patent
Tanaka et al.

(10) Patent No.: US 9,258,442 B2
(45) Date of Patent: Feb. 9, 2016

(54) IMAGE PROCESSING SYSTEM, IMAGE PROCESSING APPARATUS AND PORTABLE TERMINAL CONFIGURED TO DISPLAY AN EFFECT OF PERFORMING IMAGE ADJUSTMENT PROCESSING TO IMAGE DATA IN THE IMAGE PROCESSING APPARATUS

(71) Applicant: KYOCERA Document Solutions Inc., Osaka (JP)

(72) Inventors: Kunihiko Tanaka, Osaka (JP); Hiroshi Yokota, Osaka (JP); Masataka Takemura, Osaka (JP); Seiki Satomi, Osaka (JP); Masaki Miyashita, Osaka (JP); Shinji Hayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/617,023

(22) Filed: Feb. 9, 2015

(65) Prior Publication Data
US 2015/0237225 A1    Aug. 20, 2015

(30) Foreign Application Priority Data
Feb. 17, 2014    (JP) .................. 2014-027999

(51) Int. Cl.
*G06F 3/12*    (2006.01)
*H04N 1/00*    (2006.01)
*H04N 1/23*    (2006.01)

(52) U.S. Cl.
CPC ......... *H04N 1/00413* (2013.01); *H04N 1/0044* (2013.01); *H04N 1/00129* (2013.01); *H04N 1/00411* (2013.01); *H04N 1/2392* (2013.01); *H04N 2201/0094* (2013.01)

(58) Field of Classification Search
None
See application file for complete search history.

(56) References Cited

U.S. PATENT DOCUMENTS

| 7,239,868 B2* | 7/2007 | Furukawa | G08C 17/00 455/418 |
|---|---|---|---|
| 8,503,791 B2* | 8/2013 | Conwell | G06F 17/30265 382/190 |
| 8,902,454 B2* | 12/2014 | Liu | G06F 3/1204 358/1.15 |
| 8,970,733 B2* | 3/2015 | Faenger | H04M 1/7253 348/231.2 |
| 2008/0081666 A1* | 4/2008 | Masera | H04L 67/025 455/557 |

FOREIGN PATENT DOCUMENTS

JP    2001-169104 A    6/2001

OTHER PUBLICATIONS

Machine translation of Japanese Pub. No. 2001-169104 to Ariji, published Jun. 2001.*

* cited by examiner

*Primary Examiner* — Paul F Payer
(74) *Attorney, Agent, or Firm* — Studebaker & Brackett PC (57) ABSTRACT

An image processing apparatus displays a menu indicating one or more settings pertaining to image adjustment processing and a unique marker corresponding to a currently selected setting in the menu. A portable terminal detects the marker as depicted in a captured image that has been captured by an image capturing device and displays a screen indicating an effect of performing the image adjustment processing in accordance with a setting corresponding to the marker.

7 Claims, 8 Drawing Sheets

IMAGE PROCESSING SYSTEM, IMAGE PROCESSING APPARATUS AND PORTABLE TERMINAL CONFIGURED TO DISPLAY AN EFFECT OF PERFORMING IMAGE ADJUSTMENT PROCESSING TO IMAGE DATA IN THE IMAGE PROCESSING APPARATUS

INCORPORATION BY REFERENCE

The present application claims priority under 35 U.S.C. §119 to Japanese Patent Application No. 2014-027999, filed Feb. 17, 2014. The contents of this application are incorporated herein by reference in their entirety.

BACKGROUND

The present disclosure relates to an image processing system and an image processing apparatus.

The following explains a known example of an image forming apparatus. The image forming apparatus displays a menu indicating one or more settings pertaining to image adjustment processing on a user interface screen of the image forming apparatus. The image forming apparatus also displays a sample image which indicates an effect of performing image adjustment processing according to a setting selected by a user from among the one or more settings indicated by the menu.

SUMMARY

An image processing system according to one aspect of the present disclosure includes an image processing apparatus and a portable terminal. The image processing apparatus includes a storing section, an image processing section, a first display, and a display controlling section. The storing section stores image data. The image processing section performs image adjustment processing with respect to the image data. The display controlling section controls the first display to display a menu indicating one or more settings pertaining to the image adjustment processing and a unique marker corresponding to a currently selected setting among the one or more settings in the menu. The portable terminal includes an image capturing device, a second display, a marker detecting section, and a display processing section. The marker detecting section detects the marker as depicted in a captured image that has been captured by the image capturing device. The display processing section controls the second display to display a screen indicating an effect of performing the image adjustment processing with respect to the image data in accordance with a setting, among the one or more settings, corresponding to the marker detected by the marker detecting section.

An image processing apparatus according to another aspect of the present disclosure includes a storing section, and image processing section, a first display, and a display controlling section. The storing section stores image data. The image processing section performs image adjustment processing with respect to the image data. The display controlling section controls the first display to display a menu indicating one or more settings pertaining to the image adjustment processing and a unique marker corresponding to a currently selected setting among the one or more settings in the menu. The marker causes an apparatus having captured an image thereof to display a screen indicating an effect of performing the image adjustment processing with respect to the image data in accordance with a setting corresponding to the marker.

DETAILED DESCRIPTION

The following explains an embodiment of the present disclosure with reference to the drawings.

Figure 1:
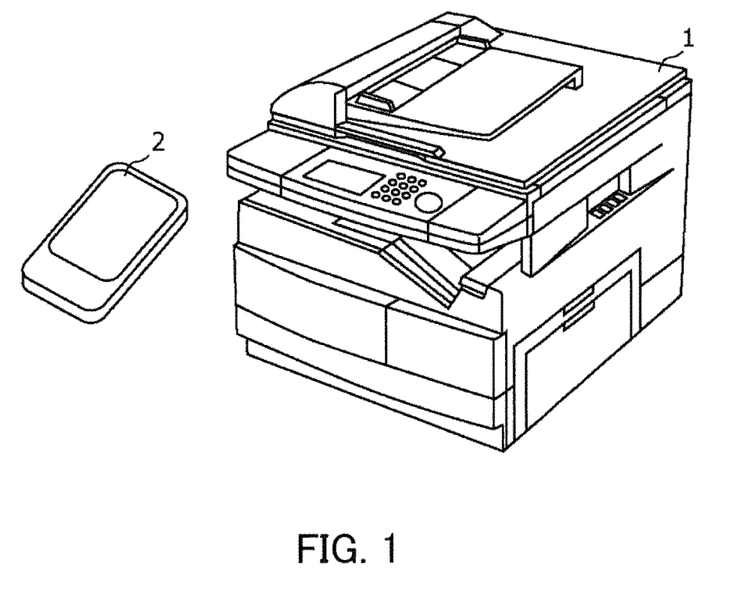
FIG. 1 is a perspective diagram of an image processing apparatus and a portable terminal included in an image processing system according to an embodiment.

FIG. 1 is a perspective diagram of an image processing apparatus 1 and a portable terminal 2 included in an image processing system according to the present embodiment.

The image processing system according to the present embodiment includes the image processing apparatus 1 and the portable terminal 2. The image processing apparatus 1 is an image forming apparatus, such as a multifunction peripheral, that performs various types of image processing, such as image adjustment processing, with respect to image data depicting a specific image. Herein, the term image adjustment processing refers to processing that adjusts appearance of an image depicted by image data which is a processing target, and more specifically processing that adjusts properties of the image such as sharpness, hue, tone, and contrast. In the present embodiment, image data which is a target for image adjustment processing is referred to as target image data. Also, an image which is a target of image adjustment processing, which in other words is an image depicted by the target image data, is referred to as a target image.

The portable terminal 2 is a terminal, such as a smart phone, that can be carried about by a user and has an image capture function.

Figure 2:
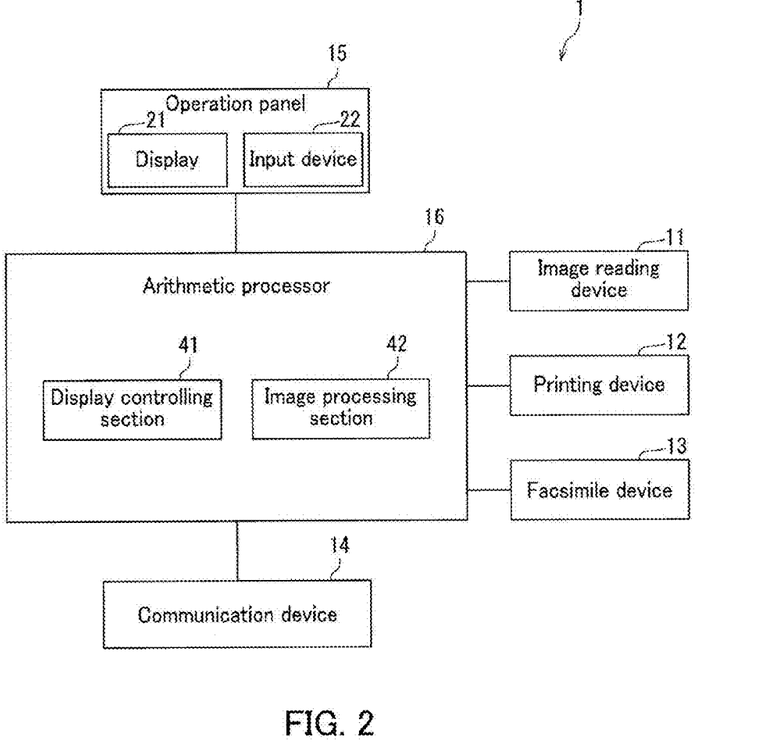
FIG. 2 is a block diagram illustrating configuration of the image processing apparatus in FIG. 1.

FIG. 2 is a block diagram illustrating configuration of the image processing apparatus 1 in FIG. 1.

The image processing apparatus 1 includes an image reading device 11, a printing device 12, a facsimile device 13, a communication device 14, an operation panel 15, and an arithmetic processor 16.

The image reading device 11 optically reads a document and thereby generates image data depicting an image of the read document.

The printing device 12 prints an image based on image data such as the image data generated through reading of the document by the image reading device 11.

The facsimile device 13 transmits, as a facsimile signal, the image data generated through reading of the document by the image reading device 11. The facsimile device 13 also generates image data based on a received facsimile signal.

The communication device 14 performs data communication with another apparatus connected via a network and is for example a network interface.

The operation panel 15 is for example located on an upper surface of a housing of the image processing apparatus 1. The operation panel 15 includes a display 21 (first display) and an input device 22. The display 21 displays various different screens including various types of information that are to be presented to a user. The display 21 is for example a liquid-crystal display. The input device 22 receives operations from the user. The input device 22 is for example one or more hard- or soft-keys. In the present embodiment, the operation panel 15 includes a touch panel 22a that functions as both the display 21 and the input device 22, and hard-keys 22b that function as the input device 22 (for example, refer to FIG. 5).

The arithmetic processor 16 is for example a central processing unit (CPU) that includes read only memory (ROM) and random access memory (RAM). The arithmetic processor 16 implements functions of a display controlling section 41 and an image processing section 42 by executing a computer program which is stored in the ROM, or a storage device (not illustrated), and loaded in the RAM.

The display controlling section 41 causes the display 21 of the operation panel 15 to display a menu (referred to below as a categories menu) 101 (refer to FIG. 5) indicating one or more categories of image adjustment processing (referred to below as processing categories). The display controlling section 41 also causes the display 21 of the operation panel 15 to display a menu (referred to below as a settings menu) 111 (for example, refer to FIG. 6) indicating one or more settings pertaining to image adjustment processing. The display controlling section 41 also causes the display 21 of the operation panel 15 to display, concurrently with the settings menu 111, a unique marker 121 (121a and 121b) corresponding to a currently selected setting in the settings menu 111 (for example, refer to FIG. 6).

Figure 6:
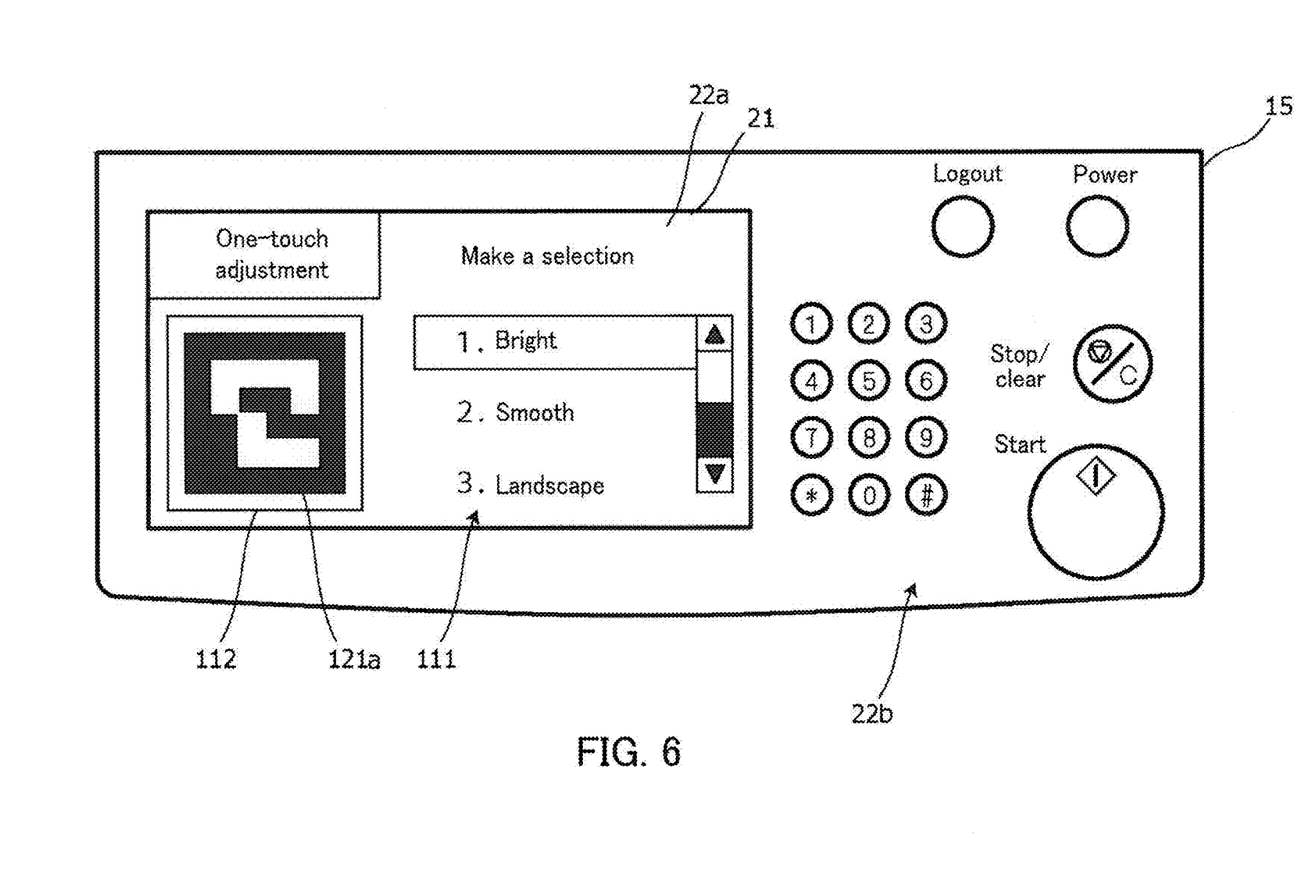
FIG. 6 is a first diagram illustrating an example of a settings menu displayed by the display of the image processing apparatus in FIG. 1.

The marker 121 is for example a letter, diagram, symbol, image, or combination of any of the above which enables the portable terminal 2 to uniquely identify the setting corresponding to the marker 121 (setting pertaining to image adjustment processing) upon the portable terminal 2 capturing an image of the marker 121. The marker 121 can for example be an augmented reality (AR) marker or a two-dimensional barcode.

Upon the currently selected setting in the settings menu 111 changing to a different setting due to an operation by the user, the display controlling section 41 switches the marker 121 displayed by the display 21 to a marker 121 corresponding to the different setting.

Figure 5:
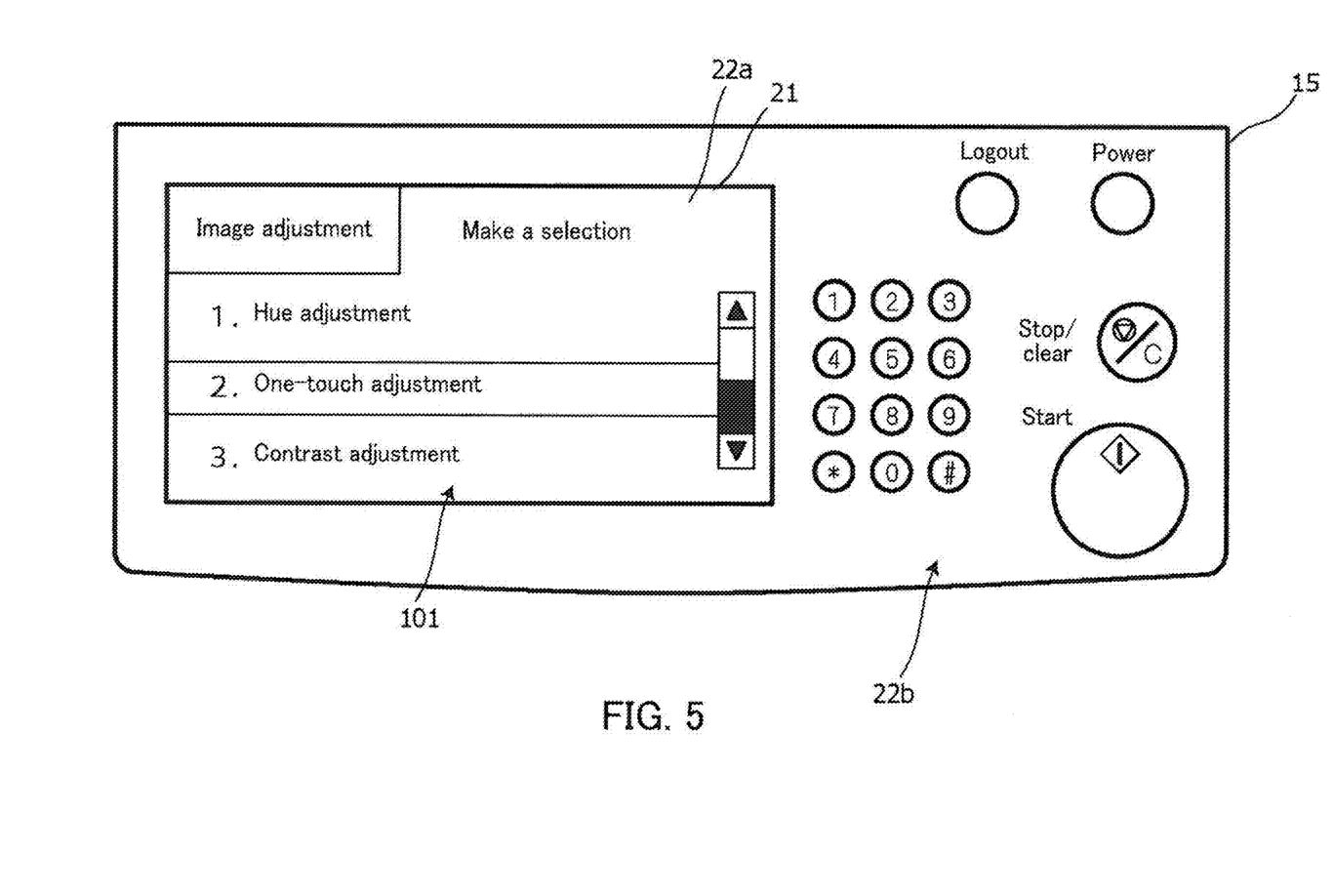
FIG. 5 illustrates an example of a categories menu displayed by a display of the image processing apparatus in FIG. 1.

The image processing section 42 performs various different categories of image adjustment processing with respect to target image data stored in a storing section (RAM or storage device), such as image data generated through reading by the image reading device 11. The category of image adjustment processing (processing category) that is performed by the image processing section 42 is for example selected from the categories menu 101 by the user. Examples of processing categories include a processing category for adjusting sharpness of an image, a processing category for adjusting hue of the image, a processing category for adjusting tone of the image, and a processing category for adjusting contrast of the image.

Figure 3:
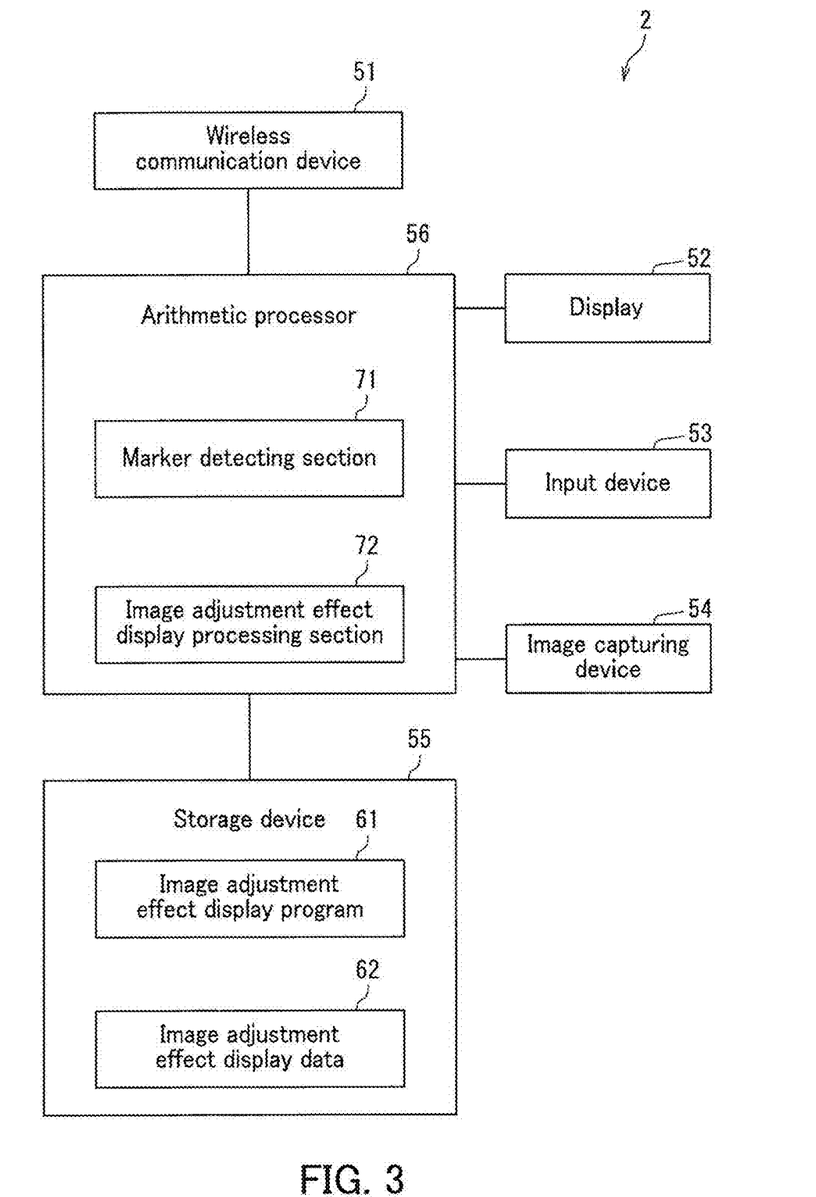
FIG. 3 is a block diagram illustrating configuration of the portable terminal in FIG. 1.

FIG. 3 is a block diagram illustrating configuration of the portable terminal 2 in FIG. 1.

The portable terminal 2 includes a wireless communication device 51, a display 52 (second display), an input device 53, an image capturing device 54, a storage device 55, and an arithmetic processor 56.

The wireless communication device 51 is a device for connecting to a mobile telephone network and is for example a baseband circuit.

The display 52 is located on a housing of the portable terminal 2 and displays various different screens. The display 52 is for example a liquid-crystal display.

The input device 53 receives operations from a user. The portable terminal 2 may for example include a touch panel that functions as both the display 52 and the input device 53.

The image capturing device 54 includes an image sensor and an optical system (not illustrated). The image capturing device 54 optically captures an image of a subject and thereby generates image data of the captured image.

The storage device 55 is a non-volatile storage device such as a flash memory. The storage device 55 stores various computer programs and data. In the present embodiment, the storage device 55 store an image adjustment effect display program 61, which is an application program, and image adjustment effect data 62.

The arithmetic processor 56 is for example a CPU that includes ROM and RAM. The arithmetic processor 56 implements functions of various processing sections by loading a computer program stored in the storage device 55 or the ROM into the RAM and executing the computer program in the RAM. More specifically, the arithmetic processor 56 implements functions of a marker detecting section 71 and an image adjustment effect display processing section (referred to below simply as a display processing section) 72 by loading the image adjustment effect display program 61 into the RAM and executing the image adjustment effect display program 61 in the RAM.

The marker detecting section 71 detects the marker 121 as depicted in a captured image that has been captured by the image capturing device 54.

The display processing section 72 identifies a setting corresponding to the marker 121 as detected by the marker detecting section 71, from among one or more settings shown in the settings menu 111. The display processing section 72 then generates a screen (referred to below as a processing-effect screen) 521 (521a and 521b) indicating the effect of image adjustment processing being performed with respect to the target image data in accordance with the identified setting (refer to FIG. 8). The display processing section 72 generates the processing-effect screen 521 based on the image adjustment effect data 62 which is explained further below. The display processing section 72 causes the display 52 to display the processing-effect screen 521 generated thereby. Herein, the processing-effect screen 521 includes the target image after image adjustment processing is performed with respect to the target image data in accordance with the identified setting (the aforementioned image is referred to below as a processed image). The processing-effect screen 521 may further include, in addition to the processed image, the target image prior to image adjustment processing being performed (the aforementioned image is referred to below as an unprocessed image).

Figure 8:
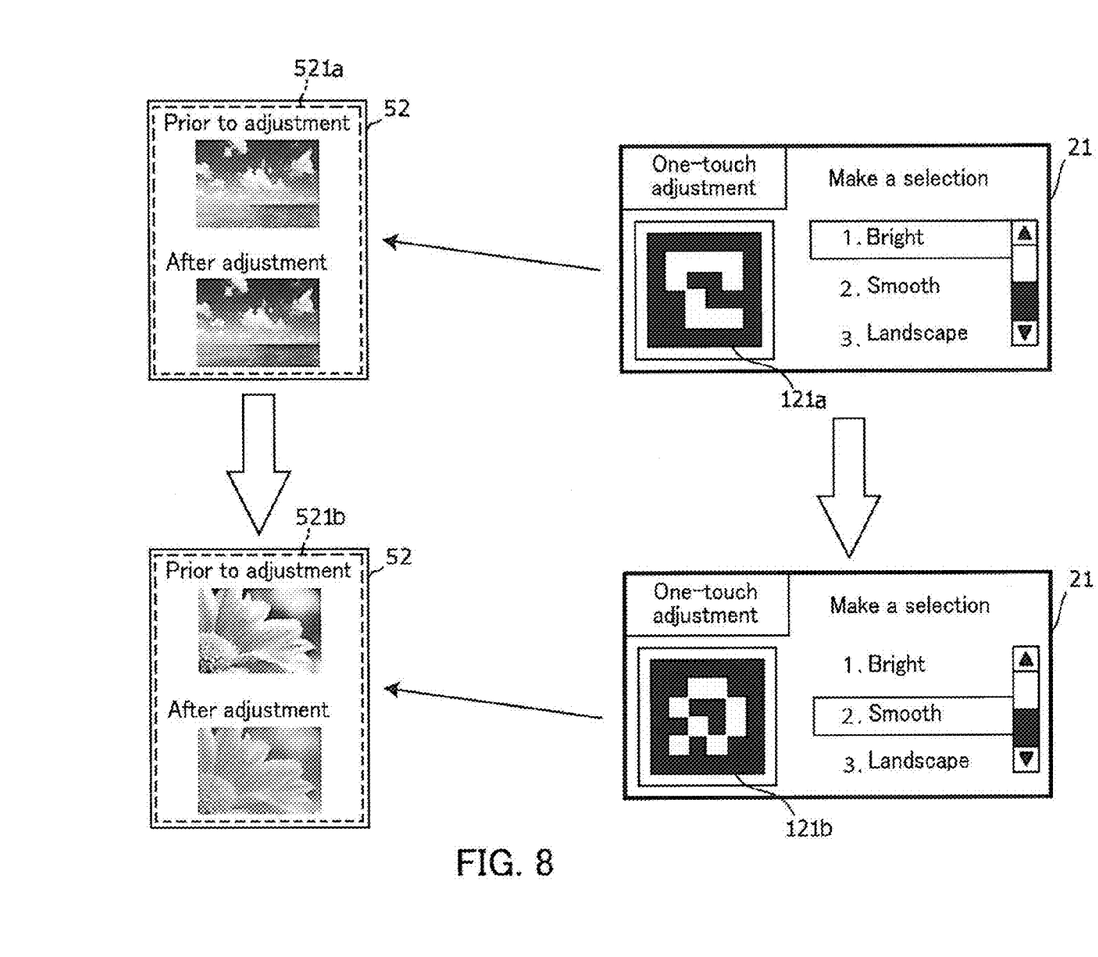
FIG. 8 illustrates an example of a processing-effect screen displayed by a display of the portable terminal in FIG. 1.

The image adjustment effect data 62 includes data configuring a processing-effect screen 521 for each of one or more settings of each of the processing categories. Data configuring a processing-effect screen 521 for a given setting includes, for example, target image data prior to image adjustment processing and target image data after image adjustment processing is performed in accordance with the given setting.

Also, upon the marker 121 detected in the captured image changing to a different marker 121, the display processing section 72 switches the processing-effect screen 521 displayed by the display 52 to a processing-effect screen 521 for a setting corresponding to the different marker 121 (i.e., a screen showing the effect of performing image adjustment processing with respect to the target image data in accordance with the setting corresponding to the different marker 121).

Note that for a single item of image adjustment processing, the image adjustment effect data 62 may include image data for a plurality of image sets. Herein, the term image set refers to a set consisting of a processed image and an unprocessed image. The display processing section 72 may cause the display 52 to display a processing-effect screen 521 which comparatively indicates an image set. Also, upon detecting a specific user operation (for example, a flick operation) on the input device 53 of the portable terminal 2, the display processing section 72 may switch the image set to a different image set.

The following explains processes performed in the image processing system according to the present embodiment.

Figure 4:
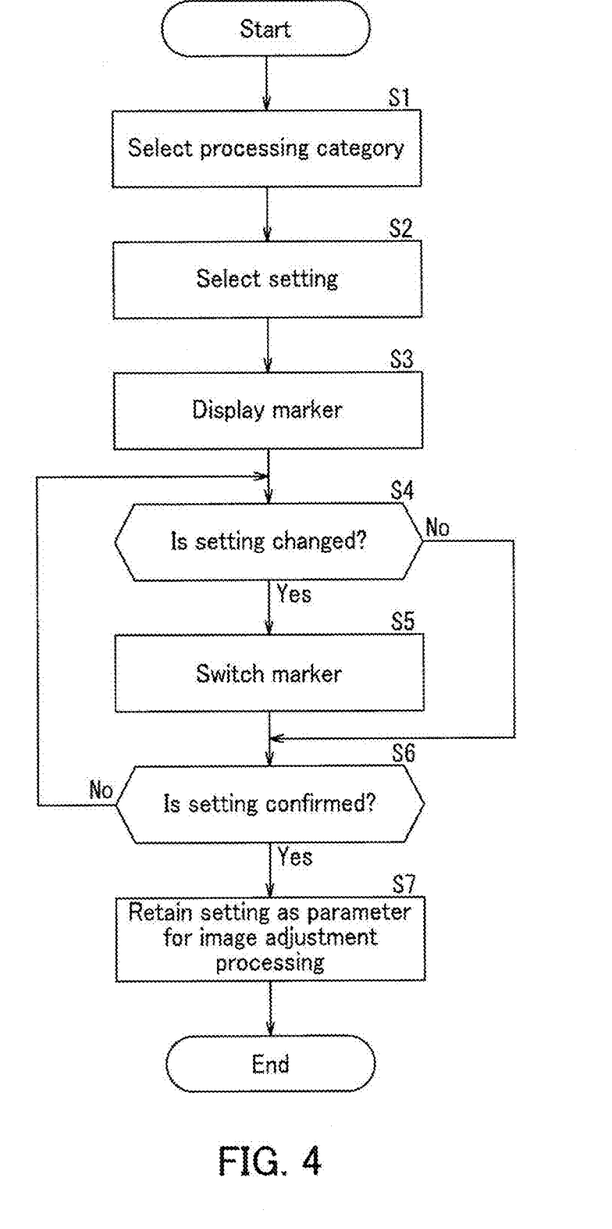
FIG. 4 is a flowchart of a process performed by the image processing apparatus in FIG. 1.

FIG. 4 is a flowchart of a process performed by the image processing apparatus 1 in FIG. 1.

First, the image processing apparatus 1 causes the display 21 of the operation panel 15 to display the categories menu 101 in response to a request from a user.

FIG. 5 illustrates an example of the categories menu 101 displayed by the display 21 of the image processing apparatus 1 in FIG. 1. As illustrated in FIG. 5, the categories menu 101 indicates one or more processing categories such as a processing category for adjusting hue (hue adjustment) and a processing category for adjusting contrast (contrast adjustment). The user can select a processing category from among the one or more processing categories in the categories menu 101, thereby selecting a category of image adjustment processing that is to be performed by the image processing apparatus 1.

The following returns to explanation of FIG. 4. Upon the user selecting a processing category in the categories menu 101 (Step S1), the display controlling section 41 causes the display 21 of the operation panel 15 to display a settings menu 111 pertaining to the selected category of image adjustment processing.

FIG. 6 is a first diagram illustrating an example of the settings menu 111 displayed by the display 21 of the image processing apparatus 1 in FIG. 1. As illustrated in FIG. 6, the settings menu 111 indicates one or more settings pertaining to image adjustment processing of the selected processing category (one-touch adjustment in the present example). The one or more settings indicated by the settings menu 111 for one-touch adjustment include settings such as "Bright", "Smooth", and "Landscape". The user can select a setting from among the one or more settings in the settings menu 111 as a setting for image adjustment processing by the image processing apparatus 1.

The following returns to explanation of FIG. 4. Upon the user selecting a setting from the settings menu 111 (Step S2), the display controlling section 41 causes the display 21 of the operation panel 15 to display a unique marker 121 corresponding to the setting which is currently selected in the settings menu 111 (Step S3).

The settings menu 111 and the marker 121 are for example arranged and displayed on the display 21 as illustrated in FIG. 6. In the example illustrated in FIG. 6, the setting "Bright" is selected in the settings menu 111 and a marker 121a corresponding to the setting "Bright" is displayed in a specific display area 112 next to the settings menu 111.

Based on an operation by the user, the image capturing device 54 of the portable terminal 2 subsequently captures an image of the marker 121. Upon capture of the aforementioned image, the marker detecting section 71 detects the marker 121 as depicted in the captured image. The display processing section 72 causes the display 52 of the portable terminal 2 to display a processing-effect screen 521 for a setting corresponding to the marker 121 which is detected. For example, in a situation in which a marker 121a corresponding to the setting "Bright" is detected by the marker detecting section 71, the display processing section 72 causes the display 52 of the portable terminal 2 to display a processing-effect screen 521a for the setting "Bright". The processing-effect screen 521a for the setting "Bright" includes, for example, a target image prior to image adjustment processing and the target image after image adjustment processing (i.e., one-touch adjustment in the present example) has been performed with respect to the target image data in accordance with the setting "Bright". In other words, the processing-effect screen 521 includes a processed image and an unprocessed image.

Next, the display controlling section 41 of the image processing apparatus 1 monitors whether a user operation is input for changing the setting pertaining to image adjustment processing or for confirming the selected setting (Steps S4 and S5). The user operation for confirming the selected setting can for example be performed through pressing of a confirmation button (not illustrated).

Upon a user operation being input through the input device 22 for changing the setting pertaining to image adjustment processing to a different setting (Step S4: Yes), the display controlling section 41 switches the marker 121 displayed by the display 21 to a marker 121 corresponding to the different setting (Step S6).

Figure 7:
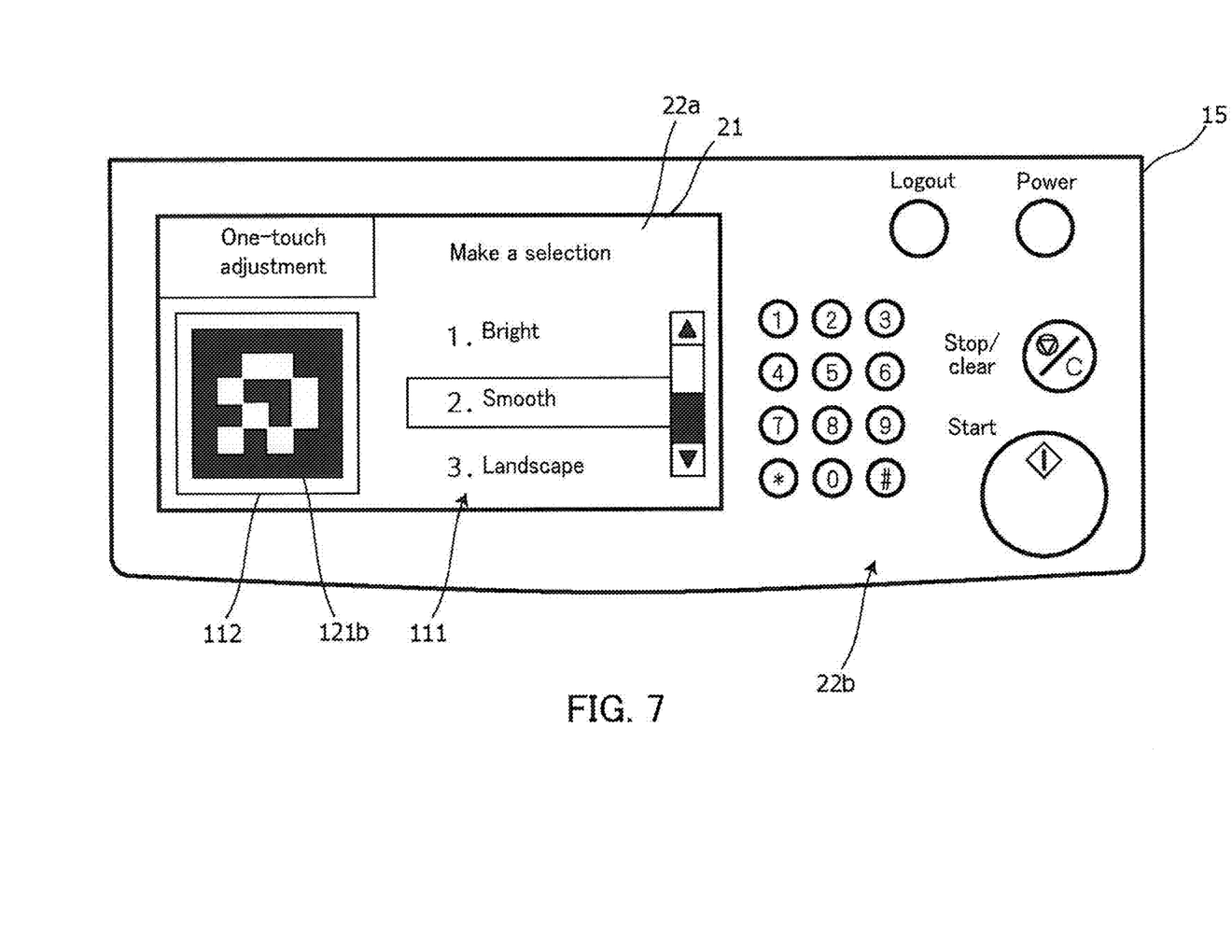
FIG. 7 is a second diagram illustrating an example of the settings menu displayed by the display of the image processing apparatus in FIG. 1.

FIG. 7 is a second diagram illustrating an example of the settings menu 111 displayed by the display 21 of the image processing apparatus 1 in FIG. 1. FIG. 7 illustrates an example in which the selected setting in the settings menu 111 has changed to "Smooth". Upon the setting "Smooth" being selected in the settings menu 111, the marker 121 displayed in the display area 112 is switched to a marker 121b corresponding to the setting "Smooth".

FIG. 8 illustrates an example of the processing-effect screen 521 displayed by the display 52 of the portable terminal 2 in FIG. 1. The image capturing device 54 of the portable terminal 2 for example intermittently captures an image of the display 21 of the operation panel 15. Upon the marker 121a corresponding to the setting "Bright" being displayed by the display 21, the marker detecting section 71 of the portable terminal 2 detects the displayed marker 121a. The display processing section 72 of the portable terminal 2 then causes the display 52 of the portable terminal 2 to display a processing-effect screen 521a for a setting corresponding to the marker 121a detected by the marker detecting section 71 (i.e., the setting "Bright").

Upon the selected setting in the settings menu 111 subsequently changing, for example from the setting "Bright" to the setting "Smooth", the display 21 displays the marker 121b corresponding to the setting "Smooth". Upon the marker 121b corresponding to the setting "Smooth" being displayed by the display 21, the marker detecting section 71 of the portable terminal 2 detects the displayed marker 121b. The display processing section 72 then switches the processing-effect screen 521a displayed by the display 52 to a processing-effect screen 521b for a setting corresponding to the marker 121b detected by the marker detecting section 71 (i.e., the setting "Smooth").

The following returns to explanation of FIG. 4. Upon a user operation being input through the input device 22 for confirming the selected setting in the settings menu 111 (Step S5:Yes), the display controlling section 41 stores the currently selected setting as a parameter for image adjustment processing (Step S7). The image processing section 42 subsequently executes image adjustment processing (more specifically, image adjustment processing of the processing category selected in the categories menu 101) with respect to target image data in accordance with the setting stored as the parameter in Step S7. Once the image adjustment processing has been executed, the image processing apparatus 1 ends the process illustrated in FIG. 4.

As explained above, in the image processing system according to the present embodiment, the image processing apparatus 1 causes the display 21 to display a menu indicating one or more settings pertaining to image adjustment processing (i.e., the settings menu 111) and a unique marker 121 corresponding to a currently selected setting in the settings menu 111. Furthermore, the portable terminal 2 detects the marker 121 as depicted in a captured image that has been captured by the image capturing device 54 and causes the display 52 to display a screen indicating an effect of performing image adjustment processing in accordance with the setting corresponding to the detected marker 121 (i.e., the processing-effect screen 521).

As a result of the above, the user can visually understand the effect (i.e., processed image) of performing image adjustment processing in accordance with the selected setting, regardless of expressive ability of the display 21 of the image processing apparatus 1 (for example, specifications of the display 21 such as size and whether the display 21 is monochromatic or color). Therefore, the user can perform setting operations pertaining to image adjustment processing by the image processing apparatus 1 while checking the processed image using the portable terminal 2.

Also, as a result of data communication between the image processing apparatus 1 and the portable terminal 2 being unnecessary, the above effects can be achieved through a simple process and security issues arising due to data communication can be avoided.

Note that the image processing apparatus 1 may have a function of printing target image data in color format, the display 21 of the image processing apparatus 1 may be a monochromatic display, and the display 52 of the portable terminal 2 may be a color display. In such a configuration, when image adjustment processing is to be performed for adjusting information pertaining to color of the target image (for example, hue or saturation), the display 21 of the image processing apparatus 1 only enables the user to check the processed image in monochromatic format. However, the present embodiment enables the user to check the processed image in color format using the display 52 of the portable terminal 2.

Note that the embodiment described above is merely a preferable example of the present disclosure and does not in any way limit the present disclosure. Also, a wide range of variations and changes are possible so long as they do not deviate from the intended scope of the present disclosure.

What is claimed is:

1. An image processing system comprising
an image processing apparatus and a portable terminal, wherein
the image processing apparatus includes:
a storing section configured to store image data;
an image processing section configured to perform image adjustment processing with respect to the image data;
a first display; and
a display controlling section configured to cause the first display to display a menu indicating one or more settings pertaining to the image adjustment processing and a unique marker corresponding to a currently selected setting among the one or more settings in the menu, and
the portable terminal includes:
an image capturing device;
a second display;
a marker detecting section configured to detect the marker as depicted in a captured image that has been captured by the image capturing device; and
a display processing section configured to cause the second display to display a screen indicating an effect of performing the image adjustment processing with respect to the image data in accordance with a setting, among the one or more settings, corresponding to the marker detected by the marker detecting section.

2. An image processing system according to claim 1, wherein
the screen indicating the effect of performing the image adjustment processing includes an image depicted by the image data after the image adjustment processing has been performed with respect to the image data.

3. An image processing system according to claim 1, wherein
the display controlling section, upon the currently selected setting in the menu changing to a different setting among the one or more settings, switches the marker displayed by the first display to a marker corresponding to the different setting, and
the display processing section, upon the marker detected in the captured image changing to a different marker, switches the screen displayed by the second display to a screen indicating an effect of performing the image adjustment processing with respect to the image data in accordance with a setting, among the one or more settings, corresponding to the different marker.

4. An image processing system according to claim 1, wherein
the image processing apparatus has a function of printing an image depicted by the image data in color format,
the first display is a monochromatic display,
the second display is a color display, and
the image adjustment processing adjusts information pertaining to color of the image depicted by the image data.

5. An image processing system according to claim 1, wherein
the screen indicating the effect of performing the image adjustment processing comparatively indicates an image set consisting of an image depicted by the image data prior to performing the image adjustment processing and an image depicted by the image data after performing the image adjustment processing.

6. An image processing system according to claim 5, wherein
the display processing section switches the image set to a different image set upon detecting a specific user operation with respect to the portable terminal.

7. An image processing apparatus comprising:
a storing section configured to store image data;
an image processing section configured to perform image adjustment processing with respect to the image data;

a first display; and a display controlling section configured to control the first display to display a menu indicating one or more settings pertaining to the image adjustment processing and a unique marker corresponding to a currently selected setting among the one or more settings in the menu, wherein the marker causes an apparatus having captured an image thereof to display a screen indicating an effect of performing the image adjustment processing with respect to the image data in accordance with a setting corresponding to the marker.

\* \* \* \* \*